US012021325B2

(12) United States Patent
Aboulkassem et al.

(10) Patent No.: US 12,021,325 B2
(45) Date of Patent: Jun. 25, 2024

(54) ELECTRICAL CONTACT ELEMENT WITH A SUPPORT RING

(71) Applicant: TE Connectivity Germany GmbH, Bensheim (DE)

(72) Inventors: Samir Aboulkassem, Bensheim (DE); Deeksha Venkadari Yogendra, Bensheim (DE); Frank Flittner, Bensheim (DE); Christian Schrettlinger, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 132 days.

(21) Appl. No.: 17/738,616

(22) Filed: May 6, 2022

(65) Prior Publication Data

US 2022/0360008 A1 Nov. 10, 2022

(30) Foreign Application Priority Data

May 10, 2021 (DE) ......................... 102021112143.4

(51) Int. Cl.

| | |
|---|---|
| ***H01R 13/05*** | (2006.01) |
| ***H01R 13/11*** | (2006.01) |
| ***H01R 24/40*** | (2011.01) |

(52) U.S. Cl.

CPC ......... *H01R 13/052* (2013.01); *H01R 13/111* (2013.01); *H01R 24/40* (2013.01)

(58) Field of Classification Search

None

See application file for complete search history.

(56) References Cited

U.S. PATENT DOCUMENTS

| | | | | |
|---|---|---|---|---|
| 4,526,429 | A * | 7/1985 | Kirkman | H01R 12/58 439/825 |
| 9,716,345 | B2 | 7/2017 | Watkins | |
| 10,249,995 | B2 * | 4/2019 | Zebhauser | H01R 13/6277 |
| 2007/0190868 | A1 | 8/2007 | De Cloet et al. | |
| 2020/0099154 | A1 | 3/2020 | Zebhauser et al. | |

FOREIGN PATENT DOCUMENTS

| | | | |
|---|---|---|---|
| DE | 19913898 | C1 | 1/2001 |
| EP | 3131158 | B1 | 12/2018 |
| WO | 2017144121 | A1 | 8/2017 |

* cited by examiner

*Primary Examiner* — Ross N Gushi
(74) *Attorney, Agent, or Firm* — Barley Snyder

(57) ABSTRACT

An electrical contact element includes a common base and a plurality of spring arms extending away from the common base along a longitudinal direction. The spring arms are arranged around an opening in a circumferential direction and are spaced from one another in a contactless relaxed initial state. An end of at least two of the spring arms facing away from the common base forms an annular segment projecting in the circumferential direction on at least one side of the end. The annular segments form a support ring and mutually support each other in a fully compressed state.

17 Claims, 3 Drawing Sheets

ELECTRICAL CONTACT ELEMENT WITH A SUPPORT RING

CROSS-REFERENCE TO RELATED APPLICATION

This application claims the benefit of the filing date under 35 U.S.C. § 119(a)-(d) of German Patent Application No. 102021112143.4, filed on May 10, 2021.

FIELD OF THE INVENTION

The present invention relates to an electrical contact element and, more particularly, to an electrical contact element with a support ring.

BACKGROUND

Electrical contact elements are used for various applications from the low-frequency range to the high-frequency range for electrically contacting a mating contact element. In the high-frequency range in particular, high normal contact forces are required to ensure reliable and constant contact. High normal contact forces lead to high plugging forces due to the increased friction caused by the normal contact force between the contact element and mating contact element. There is a need for an electrical contact element that simultaneously ensures high contact normal forces with low plugging forces.

SUMMARY

An electrical contact element includes a common base and a plurality of spring arms extending away from the common base along a longitudinal direction. The spring arms are arranged around an opening in a circumferential direction and are spaced from one another in a contactless relaxed initial state. An end of at least two of the spring arms facing away from the common base forms an annular segment projecting in the circumferential direction on at least one side of the end. The annular segments form a support ring and mutually support each other in a fully compressed state.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
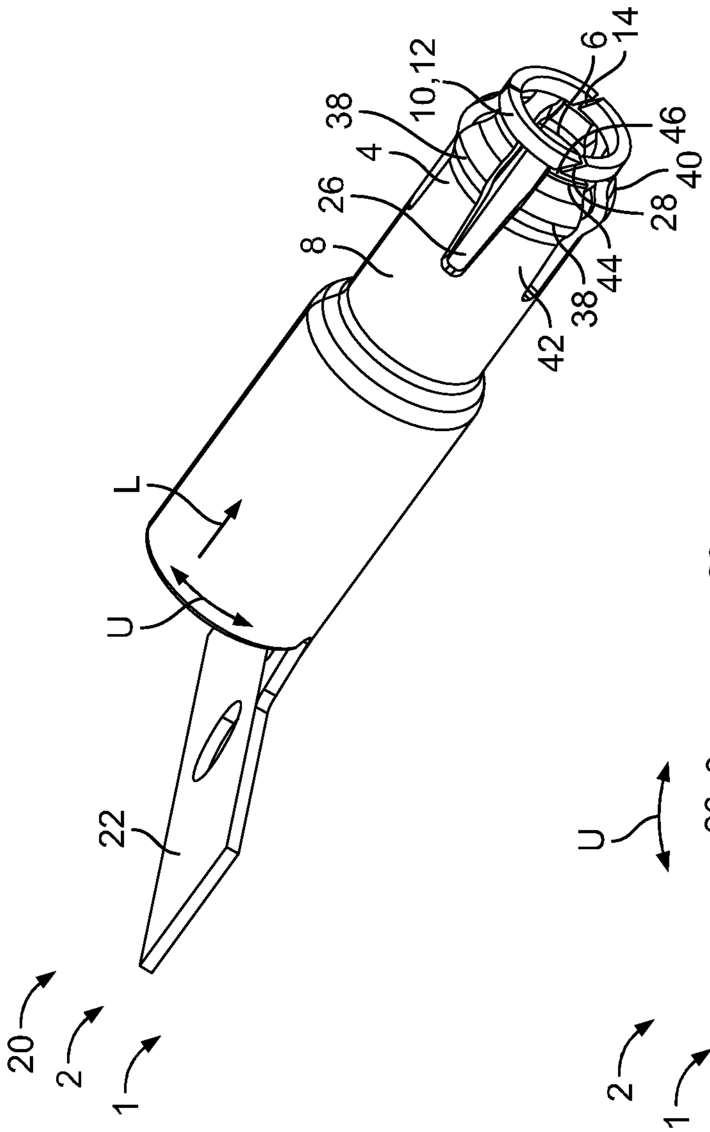
FIG. 1 is a perspective view of an electrical contact element according to an embodiment.

In the following, the invention shall be described by way of example in more detail using embodiments with reference to the appended figures. Elements in the figures that correspond to one another in terms of structure and/or function are provided with the same reference characters. The combinations of features shown and described in the individual embodiments are for explanatory purposes only. A feature of an embodiment can be dispensed with if its technical effect is of no significance for a particular application. Conversely, a further feature can be added in an embodiment should its technical effect be advantageous or necessary for a particular application.

An electrical contact element shall first be explained in more detail by way of an embodiment with reference to FIGS. 1-4.

Figure 2:
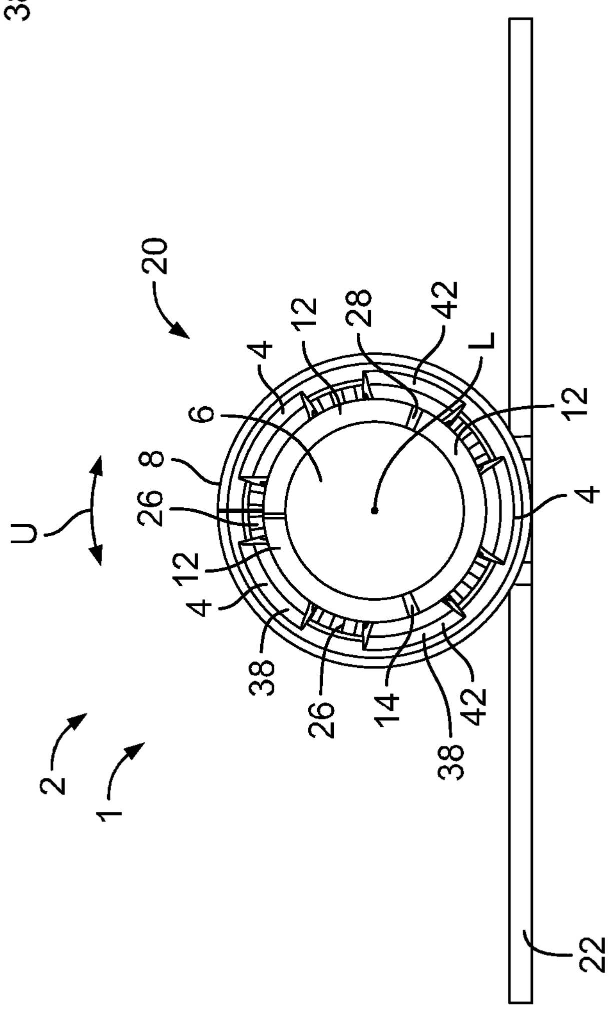
FIG. 2 is a front view of the electrical contact element.
Figure 3:
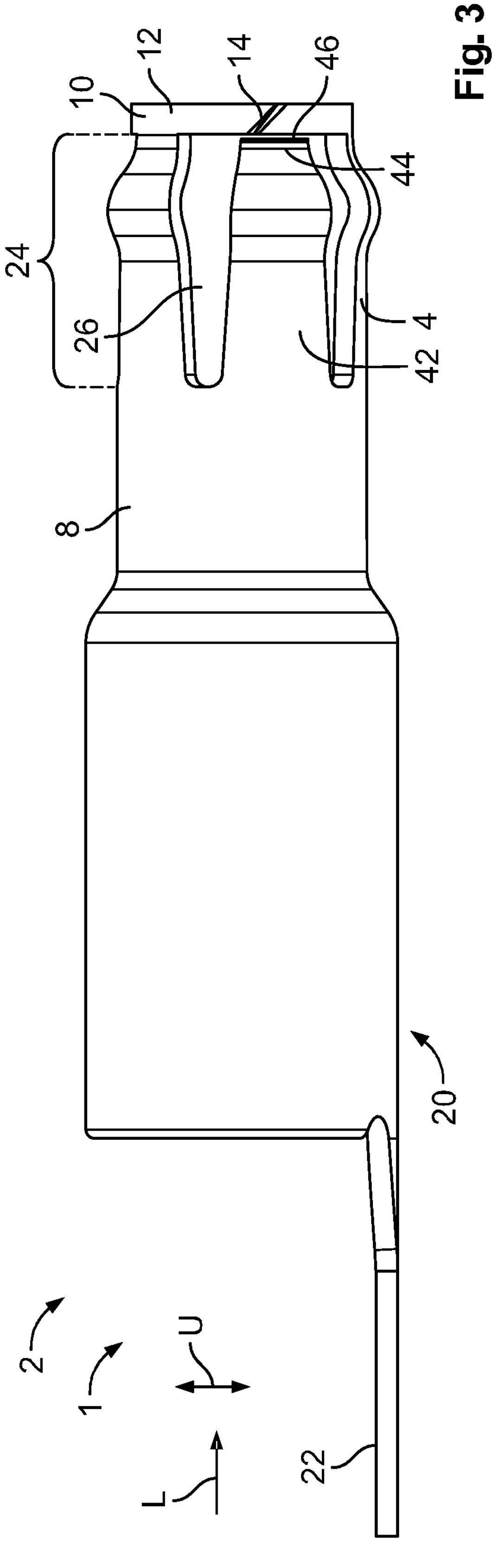
FIG. 3 is a side view of the electrical contact element.

Electrical contact element 1 according to the embodiment comprise a plurality of spring arms 4 which are spaced from one another in a contactless relaxed initial state 2 shown in FIGS. 1-3, are arranged around an opening 6 in a circumferential direction U, and extend away from a common base 8 along a longitudinal direction L. At least two spring arms 4 have ends 10 facing away from base 8 and each form an annular segment 12 which projects in circumferential direction U on at least one side.

At least two annular segments 12 can be spaced from one another in circumferential direction U, at least in the relaxed initial state 2, so that a slot 14 is formed between annular segments 12, as shown in FIGS. 1-3. As shown in the exemplary configuration, each spring arm 4 can be provided with a separate annular segment 12 which, in relaxed initial state 2, is spaced from adjacent annular segment 12 by a respective slot 14. Consequently, spring arms 4 in this exemplary configuration are self-supporting, at least in the relaxed initial state. Accordingly, spring arms 4 can be deflected independently of one another, at least in sections, as a result of which a reduction of the plugging force required during a plugging process can be obtained. Furthermore, the separation of annular segments 12 improves the ability of electrical contact element 1 to compensate for tolerances, as a result of which, for example, manufacturing tolerances and/or misalignments of the plug connectors relative to one another can be better compensated for than with conventional contact elements.

However, not all spring arms 4 need to be provided with a separate annular segment 12. For example, in another embodiment, at least two spring arms 4 can be connected to one another by way of a common annular segment and one spring arm 4 can be provided with a separate annular segment which is spaced from the common annular segment in the circumferential direction at least in relaxed initial state 2. Although the connection of two spring arms 4 by way of a common annular segment can lead to an increase in the plugging forces compared to several separate annular segments, the stability of the spring arms 4 and the normal contact forces, however, can be increased by the common annular segment.

In another embodiment, the electrical contact element 1 can comprise at least three spring arms 4 with annular segments 12 to improve the impedance as well as the EMC properties, where two of the three spring arms are rigidly connected to one another by way of a common annular segment.

Figure 4:
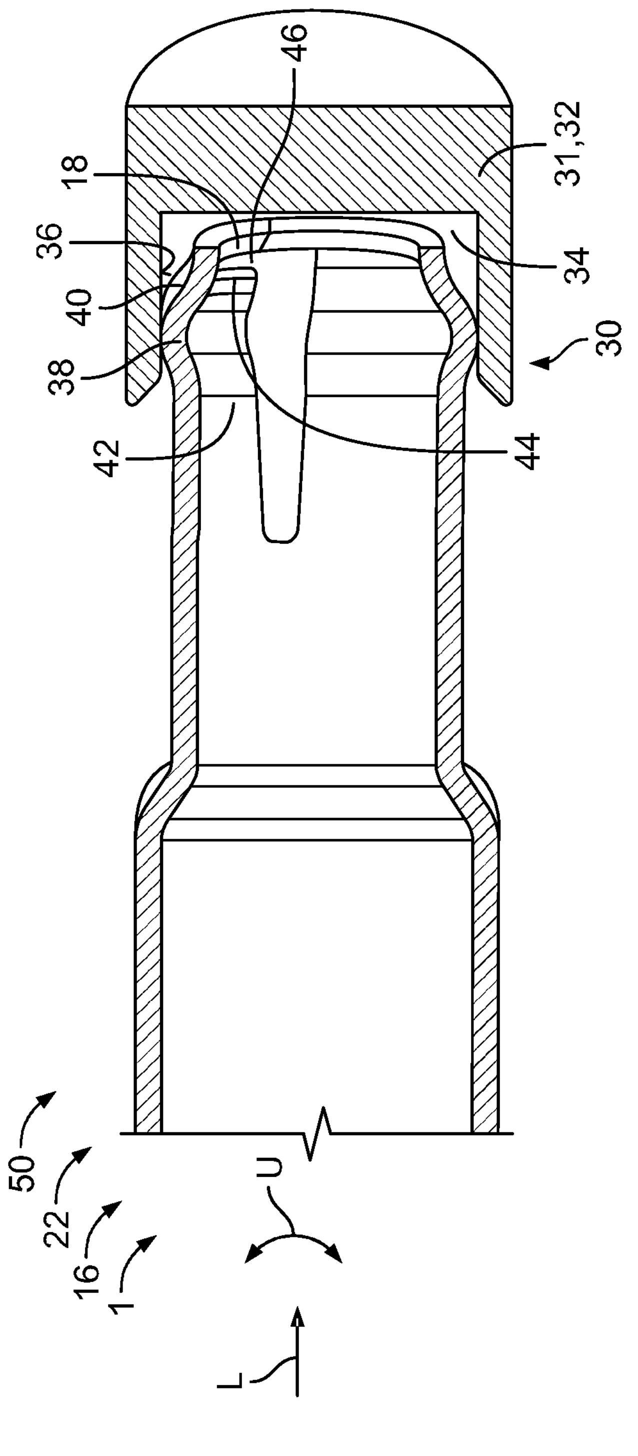
FIG. 4 is a sectional side view of a plug assembly with the electrical contact element and a mating plug connector.

Spring arms 4 are configured such that they are compressed radially inwardly to a fully compressed state 16, shown in FIG. 4, where spring arms 4 mutually support one another in the fully compressed state 16 to form a support ring 18. Consequently, the previously self-supporting spring arms 4 are no longer self-supporting in fully compressed state 16. Due to the fact that the spring arms 4 mutually support one another in the fully compressed state 16 to form support ring 18, overstretching of spring arms 4 can be prevented and a high and stable normal contact force can be obtained.

Contact element 1 can be a punched and bent member 20 for ensuring efficient production, in particular in large numbers. For example, a plurality of contact elements 1 can be molded onto a support strip 22 shown in FIGS. 1-3, as a result of which the plurality of contact elements 1 can be stored and transported in a simple manner.

Annular segments 12 can project, in particular, in circumferential direction U on both sides. In particular, annular segments 12 can be longer in circumferential direction U than a remaining section 24 of respective spring arm 4, shown in FIG. 3, extending from base 8 to end 10. Consequently, it can be prevented that remaining sections 24 of adjacent spring arms 4 in the fully compressed state 16 mutually overlap and/or rub against each other.

Accordingly, contact element 1 can comprise a recess 26 which is defined by base 8, two adjacent spring arms 4, and at least one annular segment 12. In an embodiment, slot 14 can open into corresponding recess 26, at least in relaxed initial state 2.

Annular segments 12 can be substantially of equal length in the circumferential direction U. However, as shown in the embodiment, at least two annular segments 12 can have different lengths in circumferential direction U. In order to increase the stability of individual spring arms 4 and to prevent spring arms 4 from being compressed during the plugging process, the annular segments can extend by an angle of at least about 45°, or at least about 90°, at least in relaxed initial state 2. According to the embodiment, for example, an annular segment in the relaxed state can extend in circumferential direction U by an angle of approximately 130°.

In order to prevent spring arms 4, in particular annular segments 12, from canting, annular segments 12 can comprise side surfaces 28, shown in FIGS. 1 and 2, pointing in circumferential direction U toward adjacent annular segment 12 and extending at an angle with respect to longitudinal direction L and/or circumferential direction U. Side surfaces 28 serve as stop surfaces with which annular segments 12 of adjacent spring arms 4 abut against one another at least in the fully compressed state. Accordingly, oppositely disposed side surfaces 28 can be configured to be complementary to one another so that they nestle against one another, at least in the fully compressed state 16. As shown in the embodiment, side surfaces 28 can be inclined at an angle of approximately 15° to approximately 60°, in particular at an angle of 45°, with respect to longitudinal direction L.

Spring arms 4 can be used to establish electrical contact with a mating plug connector 30, shown in FIG. 4. Mating plug connector 30 can comprise a mating contact element 31, for example, in the form of a contact socket 32 with a receptacle 34 into which contact element 1 can be inserted at least in sections. In order to contact an inner wall 36 of contact socket 32, spring arms 4 can each be provided with an outwardly projecting contact curvature 38 which is arranged in remaining section 24 between base 8 and end 10. Contact curvature 38 can project in particular radially outwardly relative to free end 10 of respective spring arm 4 so that the contact curvature forms a lead-in chamfer 40 pointing in longitudinal direction L. Inner wall 36 can then slide along lead-in chamfer 40 during the plugging process and press corresponding spring arm 4 radially inwardly.

The contact curvatures 38 of spring arms 4 are arranged along longitudinal direction L at a common height or at a height plane oriented to be perpendicular to longitudinal axis L. Accordingly, spring arms 4 can be contacted simultaneously and compressed uniformly during the plugging process. Spring arms 4 of this type prove to be particularly fail-safe even when vibrations or impacts arise.

By separating annular segments 12 in the relaxed state, the plugging force required for the plugging process can be drastically reduced, at least until the ring closure. After the ring closure, the plugging force increases because the friction between spring arms 4 and mating plug connector 30 is increased by a supporting force applied by the support ring 18. The force acting upon the support ring 18 is divided among the plurality of annular segments 12.

If the number of contact points with which the contact element 1 contacts mating plug connector 30 is to be increased without additionally increasing the plugging force after ring closure, contact element 1 can comprise at least one intermediate spring 42 arranged in recess 26 between two spring arms 4. Intermediate spring 42 can extend from common base 8 along longitudinal direction L and can be equidistant from two spring arms 4 that are adjacent in circumferential direction U.

Within the meaning of the application, a plurality of spring arms 4 or intermediate springs 42 means two to ten spring arms 4 or intermediate springs 42. In an embodiment, the number of intermediate springs 42 be fewer than the number of spring arms 4. This leads to an advantageous ratio between the plugging force and the normal contact force. As shown in this embodiment, contact element 1 can comprise three spring arms 4 and two intermediate springs 42 which are arranged around opening 6 in the circumferential direction.

In order to prevent intermediate springs 42 from rubbing against annular segments 12 or support ring 18 and possibly canting, intermediate springs 42 can have a shorter length along longitudinal direction L than spring arms 4 and form no annular segment. In particular, an end 44 facing away from the base 8 can be spaced from annular segment 12 or support ring 18 by a gap 46 along longitudinal direction L, shown in FIGS. 1 and 3. In this way, the plugging force can be kept low, even with a large number of contact points, because the at least one intermediate spring 42 is not supported on the support ring 18 after ring closure and the plugging force is therefore not further increased after ring closure. Accordingly, the at least one intermediate spring 42 forms no annular segment.

Intermediate springs 42 can also be provided with contact curvatures 38 which project radially outwardly. In an embodiment, contact curvatures 38 can be disposed at the same height or on a vertical plane arranged substantially perpendicular to the longitudinal direction L, respectively, with contact curvatures 38 of spring arms 4. Accordingly, simultaneous contacting of spring arms 4 and intermediate springs 42 can be ensured. The annular segments 12 of the spring arms 4, between which the intermediate springs 42 are arranged, can abut against one another in the fully compressed state 16 in the circumferential direction U at the height of the intermediate spring 42.

In an embodiment, the at least one intermediate spring 42 can be spaced from spring arms 4 on three narrow sides. Accordingly, the at least one intermediate spring 42 can be configured to be self-supporting, where the at least one intermediate spring 42 is protected from mechanical loads by the adjacent spring arms 4.

As can be seen in plug assembly 50 shown in FIG. 4, annular segments 12 can be dimensioned such that they form support ring 18 when the plugging process has been completed; i.e. in a fully plugged state.

Figure 5:
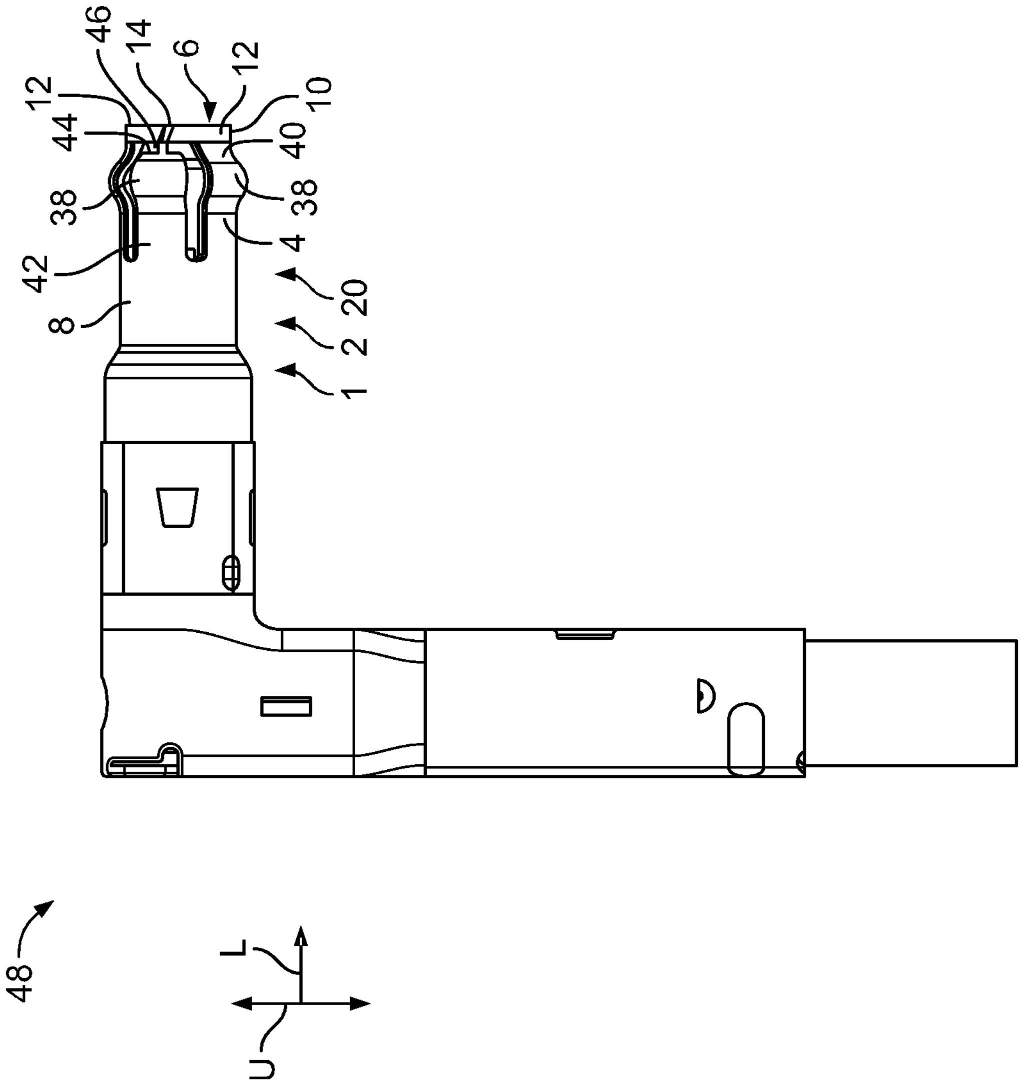
FIG. 5 is a side view of an electrical plug connector with the electrical contact element.

FIG. 5 shows an electrical plug connector 48 with an electrical contact element 1 by way of example. Plug connector 48 can be a coaxial plug connector, where contact element 1 is configured to contact a mating plug connector 30 (see FIG. 4) radially outwardly. In an embodiment, plug connector 48 can be a coaxial high-frequency plug connector for frequencies in the range from approximately 3 MHz to approximately 20 GHz, or approximately 15 GHz.

With high-frequency plug connectors, there are high demands on the contact capability and contact normal force, which are obtained with conventional plug connectors at the expense of high plugging forces. Due to the division into individual annular segments 12, the plugging force can be reduced, while at the same time the required contact capability and normal contact force are ensured by support ring 18 that forms in fully compressed state 16.

In the radially fully compressed state 16, the contour of the contact element 1 corresponds to a conventional closed contact sleeve. Consequently, existing plug connector systems can easily be retrofitted with the contact element 1. There is no need to redesign the entire plug connector system for contacting a contact element.

What is claimed is:

1. An electrical contact element, comprising:

a common base;

a plurality of spring arms extending away from the common base along a longitudinal direction, the spring arms are arranged around an opening in a circumferential direction and are spaced from one another in a contactless relaxed initial state, the spring arms have a pair of annular segments separated from each other and formed on a pair of ends of at least two of the spring arms facing away from the common base, the annular segments each project in the circumferential direction on at least one side of one of the ends, the annular segments form a support ring and mutually support each other in a fully compressed state; and an intermediate spring extending from the common base in the longitudinal direction between a pair of spring arms of the plurality of spring arms that are adjacent in the circumferential direction, the intermediate spring is shorter in the longitudinal direction than the spring arms.

2. The electrical contact element of claim 1, wherein at least one of the annular segments projects in the circumferential direction on a pair of opposite sides of the end of at least one of the spring arms.

3. The electrical contact element of claim 1, wherein the annular segments have an equal length in the circumferential direction.

4. The electrical contact element of claim 1, wherein each of the spring arms forms a separate annular segment.

5. The electrical contact element of claim 1, wherein at least two of the spring arms are connected by a common annular segment.

6. The electrical contact element of claim 1, wherein the spring arms each have a contact curvature between the common base and the end of the spring arm opposite the common base.

7. The electrical contact element of claim 6, wherein the contact curvature projects radially outwardly.

8. The electrical contact element of claim 1, wherein each of the annular segments projects in the circumferential direction beyond a remaining section of one of the spring arms.

9. The electrical contact element of claim 1, wherein the intermediate spring does not form any of the annular segments.

10. The electrical contact element of claim 1, wherein the intermediate spring is one of a plurality of intermediate springs, a number of intermediate springs is less than a number of spring arms.

11. The electrical contact element of claim 1, wherein the intermediate spring has a contact curvature projecting radially outwardly.

12. The electrical contact element of claim 11, wherein the spring arms each have a contact curvature between the common base and the end of the spring arm opposite the common base.

13. The electrical contact element of claim 12, wherein the contact curvature of the intermediate spring and the contact curvature of the spring arms are arranged at a common height.

14. The electrical contact element of claim 1, wherein a side surface of the annular segment abutting against an adjacent annular segment in the circumferential direction in the fully compressed state extends at an angle with respect to at least one of the longitudinal direction and the circumferential direction.

15. A plug assembly, comprising:

an electrical contact element including a common base, a plurality of spring arms extending away from the common base along a longitudinal direction, and an intermediate spring, the spring arms are arranged around an opening in a circumferential direction and are spaced from one another in a contactless relaxed initial state, the spring arms have a pair of annular segments separated from each other and formed on a pair of ends of at least two of the spring arms facing away from the common base, the annular segments each project in the circumferential direction on at least one side of one of the ends, the annular segments form a support ring and mutually support each other in a fully compressed state, the intermediate spring extends from the common base in the longitudinal direction between a pair of spring arms of the plurality of spring arms that are adjacent in the circumferential direction, the intermediate spring is shorter in the longitudinal direction than the spring arms.

16. The plug assembly of claim 15, further comprising a mating contact element matable with the electrical contact element and compressing the spring arms to the fully compressed state.

17. An electrical contact element, comprising:

a common base;

a plurality of spring arms extending away from the common base along a longitudinal direction, the spring arms are arranged around an opening in a circumferential direction and are spaced from one another in a contactless relaxed initial state, the spring arms have a pair of annular segments separated from each other and formed on a pair of ends of at least two of the spring arms facing away from the common base, the annular segments each project in the circumferential direction on at least one side of one of the ends, the annular segments form a support ring and mutually support each other in a fully compressed state; and an intermediate spring extending from the common base in the longitudinal direction between a pair of spring arms of the plurality of spring arms that are adjacent in the circumferential direction, the intermediate spring does not form any of the annular segments.

* * * * *